(12) United States Patent
Han

(10) Patent No.: US 9,710,255 B1
(45) Date of Patent: Jul. 18, 2017

(54) UPDATING SYSTEM OF FIRMWARE OF COMPLEX PROGRAMMABLE LOGIC DEVICE AND UPDATING METHOD THEREOF

(71) Applicants: Inventec (Pudong) Technology Corporation, Shanghai (CN); INVENTEC CORPORATION, Taipei (TW)

(72) Inventor: Ying-Xian Han, Shanghai (CN)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 0 days.

(21) Appl. No.: 15/158,135

(22) Filed: May 18, 2016

(30) Foreign Application Priority Data

Jan. 5, 2016 (CN) .......................... 2016 1 0004529

(51) Int. Cl.
*G06F 9/44* (2006.01)
*G06F 9/445* (2006.01)

(52) U.S. Cl.
CPC . *G06F 8/65* (2013.01); *G06F 8/66* (2013.01)

(58) Field of Classification Search
CPC .................................... G06F 8/65; G06F 8/66
USPC ................................................ 717/168, 170
See application file for complete search history.

(56) References Cited

U.S. PATENT DOCUMENTS

| 8,225,081 B2 * | 7/2012 | Aldereguia | G06F 8/65 |
| | | | 713/1 |
| 2010/0058274 A1 * | 3/2010 | Pike | H04L 45/60 |
| | | | 716/128 |
| 2014/0289506 A1 * | 9/2014 | Ikeda | G06F 8/65 |
| | | | 713/100 |

FOREIGN PATENT DOCUMENTS

CN 101853172 B 7/2014

* cited by examiner

*Primary Examiner* — Phillip H Nguyen
(74) *Attorney, Agent, or Firm* — Muncy, Geissler, Olds & Lowe, P.C.

(57) ABSTRACT

In the updating system, the CPLD has an original firmware version data and a PCH of a processing chip includes a storage which stores an updating identification code table and at least one updating firmware data. The updating identification code table has at least one updating identification code which is corresponded to the updating firmware data respectively. A processing unit of the processing chip has an identification code and an updating program. In the updating method, a first step is provided to capture the updating identification code table after the updating program is triggered. A second step is provided to capture the updating firmware data when the identification code is same as the updating identification code. A third step is provided to replace the original firmware version data from the updating firmware data through the PCH.

8 Claims, 4 Drawing Sheets

UPDATING SYSTEM OF FIRMWARE OF COMPLEX PROGRAMMABLE LOGIC DEVICE AND UPDATING METHOD THEREOF

BACKGROUND OF INVENTION

1. Field of the Invention

The present invention is related to an updating system of a firmware of a complex programmable logic device (CPLD) and the updating method thereof, and more particularly related to the updating system of a firmware of the CPLD, which updates the CPLD through a platform controller hub (PCH), and the updating method thereof.

2. Description of the Prior Art

Attending with the progress of technology, network has played an indispensable role in our daily lives, and people are used to work with personal computers such as desktops or laptops, or even handle multinational e-business through the network. A server is an important apparatus for the construction of network, and thus are widely used in the server room of the industries of internet service provider (ISP).

In general, CPLD plays an important role during the operation of the server. The CPLD is utilized for controlling power-on and power-off time sequence of the server system and the setting of the registers. Once an error of the time sequence or the setting in the registers exists, the server would be powered off. In practice, it is usually necessary to update the firmware of the CPLD regularly to meet the needs of various operating businesses. Some specific servers in present have the baseboard management controller (BMC), which is electrically connected to the CPLD and can be used by the user to update the firmware of the CPLD. However, for the servers without the BMC, it would be difficult for the user to update the firmware of the CPLD and thus the conventional technology has some defects and needs to be improved.

SUMMARY OF THE INVENTION

As mentioned, for the server without the BMC, there exists the problem of difficulty to update the firmware. Accordingly, an updating system of a firmware of a CPLD and the updating method thereof is provided in the present invention, which updates the firmware version data of the CPLD through the broadly used platform controller hub (PCH) to resolve the above mentioned problem.

In accordance with the above mentioned object, an updating system of a firmware of a CPLD is provided in the present invention. The updating system comprises a CPLD and a processing chip set. The CPLD has an original firmware version data. The processing chip set comprises a PCH and a processing unit. The PCH is electrically connected to the CPLD and includes a storage unit which stores an updating identification code table and at least one first updating firmware data. The updating identification code table includes one-to-one correspondence between at least one updating identification code and the at least one first updating firmware data. The processing unit is electrically connected to the PCH, and includes an identification code and an updating program. After the updating program is triggered, the processing unit is utilized to access the updating identification code table from the storage unit, determine whether the identification code matches one of the at least one updating identification code, and when a match is found, capture the first updating firmware version data corresponding to the matched at least one updating identification code and transmit the first updating firmware version data through the PCH to the CPLD to replace the original firmware version data.

In accordance with an embodiment of the above mentioned updating system of the present invention, the PCH is electrically connected to the CPLD through a first joint test action group (JTAG) interface, and the processing unit is a central processing unit (CPU). In addition, the updating system of a firmware of a CPLD further comprises a multiplexer, a second JTAG interface, and a detecting module. The multiplexer is electrically connected between the CPLD and the processing chip set. The second JTAG interface is utilized for establishing an electric connection to pluggable updating connecting wire. The detecting module is electrically connected to the second JTAG interface and the multiplexer, for transmitting a first digital signal to the multiplexer when the updating connecting wire is plugged in and electrically connected to the second JTAG interface to have the second JTAG interface electrically connected to the CPLD through the multiplexer so as to transmit a second updating firmware version data through the updating connecting wire to the CPLD to replace the original firmware version data. In addition, the detecting module is also utilized for transmitting a second digital signal to the multiplexer when the updating connecting wire is plugged out from the second JTAG interface to have the processing chip set electrically connected to the CPLD through the multiplexer so as to transmit the first updating firmware version data through the PCH to the CPLD to replace the original firmware version data when the updating program is triggered.

An updating method by using the above mentioned updating system of a firmware of the CPLD is also provided in accordance with the present invention. The updating method comprises steps (a) to (d). Step (a) is to trigger the updating program to access the updating identification code table. Step (b) is to determine whether the identification code matches one of the at least one updating identification code. Step (c) is to access the first updating firmware version data corresponding to the at least one updating identification code if the determination of step (b) is yes. Step (d) is to transmit the first updating firmware version data to the CPLD through the PCH to replace the original firmware version data.

In accordance with an embodiment of the above mentioned updating method of the present invention, the PCH is electrically connected to the CPLD through a first JTAG interface, the processing unit is a CPU, and the updating system of the firmware of the CPLD further comprises a multiplexer and a second JTAG interface. The multiplexer is electrically connected between the CPLD and the processing chip set. The second JTAG interface is utilized for establishing an electric connection to pluggable updating connecting wire. Before the step (a), the updating method further comprises the steps (a0) to (a2). Step (a0) is to determine whether the updating connecting wire is electrically connected to the second JTAG interface. Step (a1) is to have the second JTAG interface electrically connected to the CPLD through the multiplexer and transmit a second updating firmware version data through the updating connecting wire to the CPLD to replace the original firmware version data if the determination of the step (a0) is yes. Step (a2) is to have the processing chip set electrically connected to the CPLD through the multiplexer and perform the step (a) if the determination of the step (a0) is no.

By using the updating system of a firmware of the CPLD and the updating method thereof provided in accordance with the present invention, because the original firmware version data in the CPLD can be updated through the PCH, operational convenience can be significantly enhanced.

BRIEF DESCRIPTION OF THE DRAWINGS

The present invention will now be specified with reference to its preferred embodiment illustrated in the drawings, in which.

DESCRIPTION OF THE PREFERRED EMBODIMENT

There are various embodiments of the updating system of a firmware of a CPLD provided in the present invention, which are not repeated hereby. Two preferred embodiments are mentioned in the following paragraphs as an example.

Figure 1:
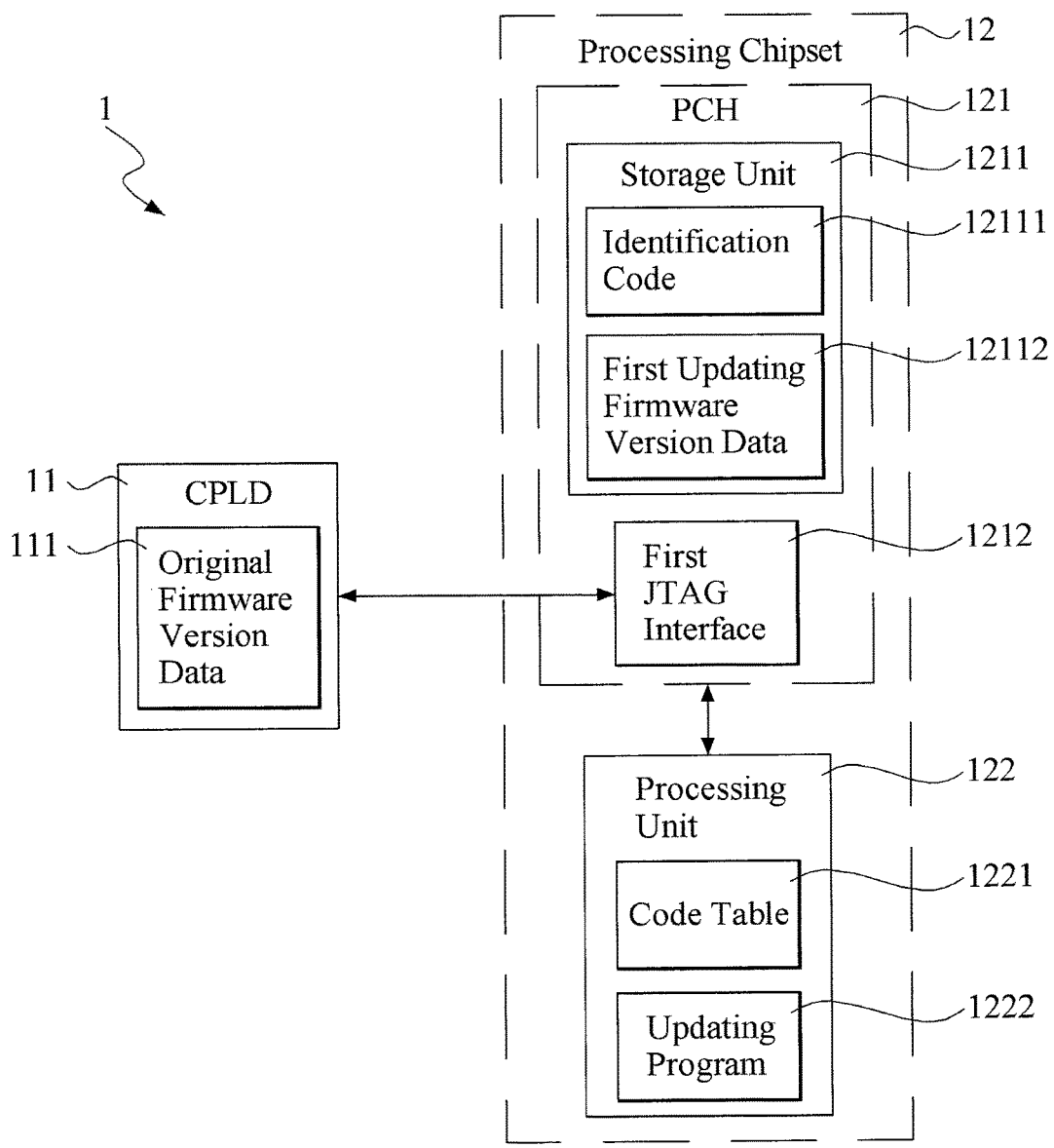
FIG. 1 is a block diagram showing the updating system of a firmware of a complex programmable logic device in accordance with first preferred embodiment of the present invention.

Please refer to FIG. 1, which is a block diagram showing the updating system of a firmware of a CPLD in accordance with first preferred embodiment of the present invention. As shown, the updating system of the firmware of the CPLD includes a CPLD 11 and a processing chip set 12.

The CPLD 11 is set with an original firmware version data 111. In the present embodiment, the original firmware version data 111 indicates the updating file including the version number. The processing chip set 12 includes a platform controller hub (PCH) 121 and a processing unit 122. The PCH 121 is electrically connected to the CPLD 11 and includes a storage unit 1211 and a first joint test action group (JTAG) interface 1212. The storage unit 1211, such as an existing memory, stores an updating identification code table 12111 and at least one first updating firmware data 12112. The updating identification code table 12111 includes correspondence between at least one updating identification code and the at least one first updating firmware data 12112. The at least one first updating firmware data 12112 is one-to-one corresponding to the at least one updating identification code, such as the updating identification code table 12111 shown in the following table. It should be noted that, in the present preferred embodiment, the first updating firmware version data 12112 indicates the updating file with the version number. That is, rather than merely the version number, the storage unit 1211 may store the updating file corresponding to the version number in the following table.

| Updating identification code | First updating firmware version data |
|---|---|
| 00000001 | V1.0 |
| 00000002 | V1.1 |
| 00000003 | V1.2 |
| 00000004 | V1.3 |

The first JTAG interface 1212 is electrically connected to the CPLD 11 such that the PCH 121 is electrically connected to the CPLD 11 through the first JTAG interface 1212. The processing unit 122 is electrically connected to the PCH 121 and includes an identification code 1221 and an updating program 1222. The processing unit 122 can be a central processing unit (CPU) for example, but the present invention is not so restricted. The identification code 1221 can be the code of the processing unit 122 itself, such as the code 00000002. In general, the amount of numbers in the identification code are corresponding to the amount of numbers of the updating identification code, but the present invention is not so restricted. In addition, the updating program 122 can be an existing program.

After the updating program 1222 is triggered (either manually or automatically), the processing unit 122 accesses the updating identification code table 12111 in the storage unit 1211, and determines whether the identification code 1221 matches one of the at least one updating identification code by using the updating program. The determination step can be performed by mapping the identification code to each of the updating identification codes to check if the codes are the same. For example, the identification code 1221 in the first preferred embodiment of the present invention is 00000002, which is the same as one of the above mentioned updating identification codes. Thus, the processing unit 122 may access the first updating firmware version data 12112 corresponding to the matched updating identification code, i.e. the V1.1 version data, in the storage unit 1211. The processing unit 122 may also transmit the first updating firmware version data 12112 through the PCH 121 to the CPLD 11 to replace the original firmware version data 111 so as to complete the updating procedure.

It is noted that the processing unit 122 transmits the first updating firmware version data 12112 to the PCH 121, and the PCH 121 further transmits the first updating firmware version data 12112 through the first JTAG interface 1212 to the CPLD 11, wherein the first firmware version data 12112 is transmitted as the signal with JTAG format to the CPLD 11.

Figure 2:
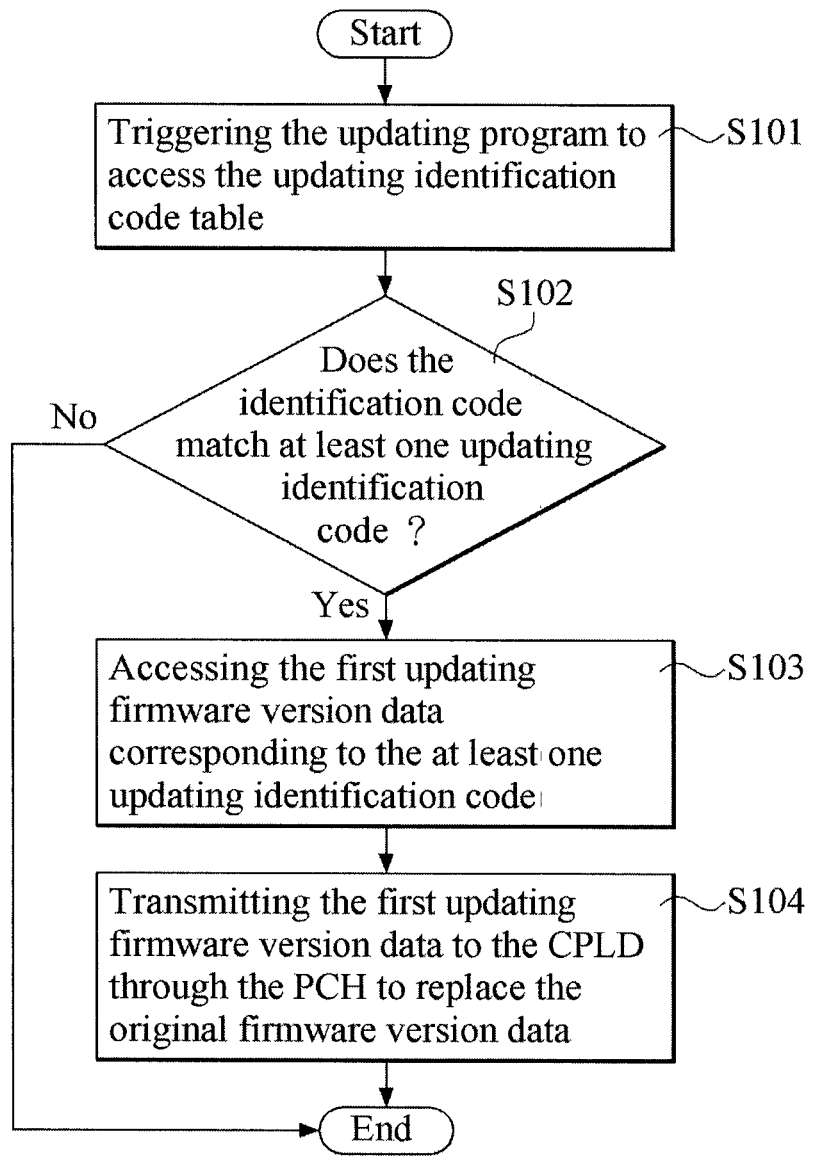
FIG. 2 is a flowing chart showing the updating system in accordance with first preferred embodiment of the present invention.

Please refer to both FIG. 1 and FIG. 2, wherein FIG. 2 is a flowing chart showing the updating system in accordance with first preferred embodiment of the present invention. As shown, the updating method of the present embodiment is applied to the updating system 1 of the firmware of the CPLD shown in FIG. 1, and is performed by using the updating system 1. The updating method comprises the steps of:

Step S101: triggering the updating program 1222 to access the updating identification code table 12111.

Step S102: determining whether the identification code 1221 matches one of the at least one updating identification code.

Step S103: accessing the first updating firmware version data 12112 corresponding to the at least one updating identification code.

Step S104: transmitting the first updating firmware version data 12112 to the CPLD 11 through the PCH 121 to replace the original firmware version data 111 so as to complete the updating procedure.

The step S101 can be performed either manually or automatically. For example, the user may select an icon displayed on a monitor during the operation of the updating program 1222 to trigger the updating program 1222 manually, or the updating program 1222 may be triggered automatically when the server is powered on by setting the program code. The selection of triggering methods depends on the need in practice, which is not so restricted. In addition, the step S101 may be performed by the processing unit 122, which accesses the updating identification code table 12111 in the storage unit 1211.

The determination step S102 is also performed by the processing unit 122 (to be more precisely, the updating program 1222), and the step S103 is also performed by the processing unit 122 to access the first updating firmware version data 12112 of the matched updating identification code from the storage unit 1211. In addition, the step S104 is also performed by the processing unit 122 to transmit the first updating firmware version data 12112 to the PCH 121. The other portion can be referred to the description of the updating system 1 of the firmware of the CPLD and thus is not repeated here.

Figure 3:
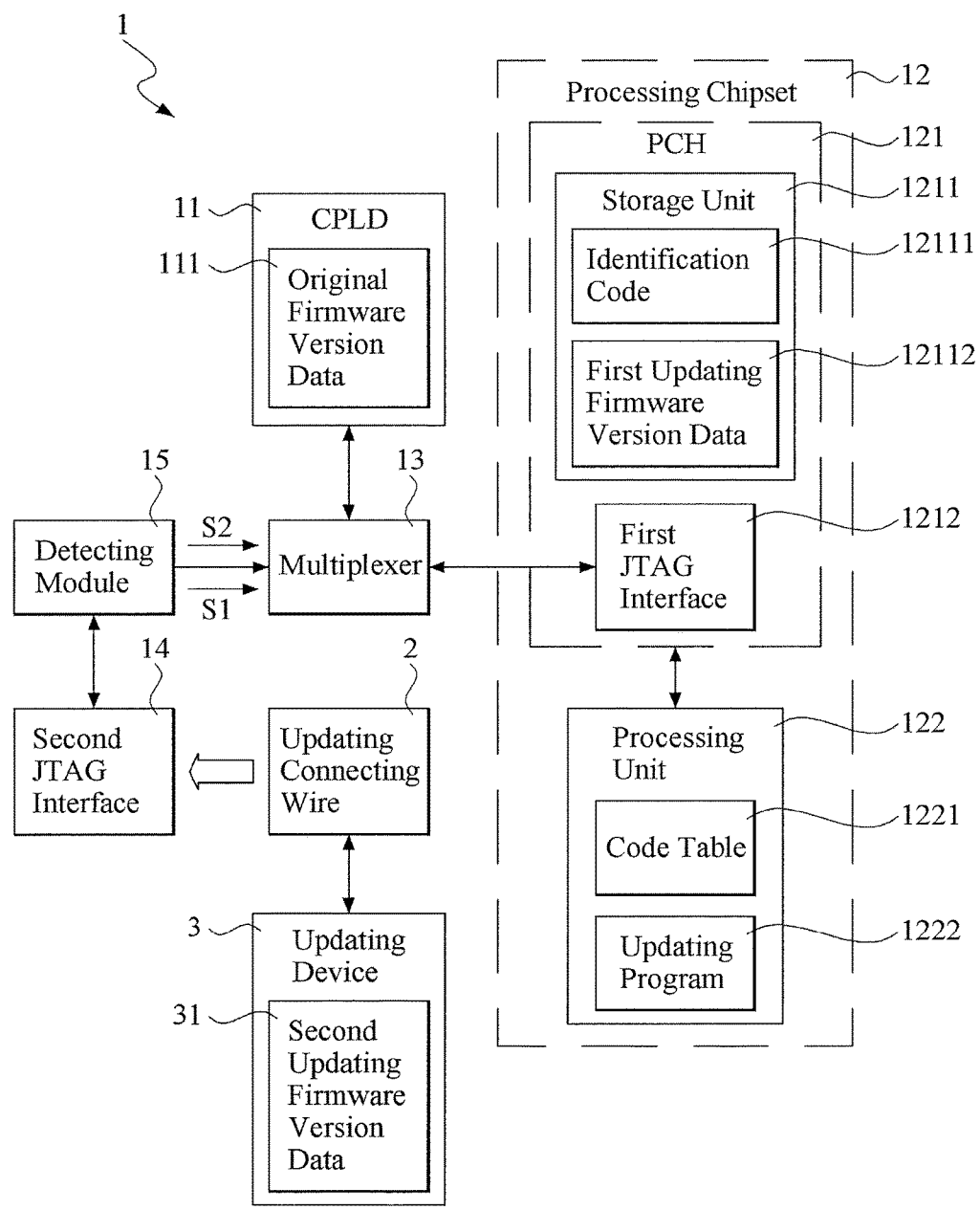
FIG. 3 is a block diagram showing the updating system of a firmware of a complex programmable logic device in accordance with second preferred embodiment of the present invention.

Please refer to FIG. 3, which is a block diagram showing the updating system of a firmware of a CPLD in accordance with second preferred embodiment of the present invention. As shown, in compared with the first preferred embodiment of the present invention, the updating system 1 of the firmware of the CPLD in the present embodiment further comprises a multiplexer (MUX) 13, a second JTAG interface 14, and a detecting module 15. The multiplexer 13 is electrically connected between the CPLD 11 and the processing chip set 12. The second JTAG interface 14 is utilized for electrically connecting an updating connecting wire 2. The updating connecting wire 2 can be further used to electrically connect an updating device 3, which is set with a second updating firmware version data 31. The updating device 3 can be the existing electronic device such as the desktop, the notebook, and etc. In addition, the detecting module 15 is electrically connected to the second JTAG interface 14 and the multiplexer 13. The detecting module 15 can be the existing processor with processing capability, such as the component integrated in the processing chip set 12 or the processing unit 122 itself.

Two different methods for updating the original firmware version data 111 are provided in the second preferred embodiment of the present invention. The first updating method is to plug the updating connecting wire 2 into the second JTAG interface 14 to have the updating connecting wire 2 electrically connected to the second JTAG interface 14. As the detecting module 15 detects that the second JTAG interface 14 is electrically connected to the updating connecting wire 2, the detecting module 14 may transmit a first digital signal S1 to the multiplexer 13. The first digital signal S1 may be a binary 0. After the multiplexer 13 has received the first digital signal S1, the path between the second JTAG interface 14 and the CPLD 11 is conducted to have the second JTAG interface 14 electrically connected to the CPLD 11 through the multiplexer, then, the updating device 3 is selected to update the CPLD 11 by transmitting the second updating firmware version data 31 through the updating connecting wire 2 to the CPLD 11 to replace the original firmware version data 111 so as to complete the updating procedure.

The second updating method is to perform the updating procedure when the updating connecting wire 2 is plugged out of the second JTAG interface 14 to disconnect the second JTAG interface 14, or when the updating connecting wire 2 is electrically separated from the second JTAG interface 14 in the beginning. As the detecting module 15 detects that the second JTAG interface 14 is not electrically connected to the updating connecting wire 2, the detecting module 15 may transmit a second digital signal S2 to the multiplexer 13. The second digital signal S2 may be a binary 1. After the multiplexer 13 has received the second digital signal S2, the path between the processing chip set 12 and the CPLD 11 is conducted to have the processing chip set 12 electrically connected to the CPLD 11 through the multiplexer 13. Then, as the updating program 1222 is triggered, the processing chip set 12 may transmit the first updating firmware version data 12112 through the PCH 121 to the CPLD 11 to replace the original firmware version data 111 so as to complete the updating procedure.

The updating process of the second updating method after the processing chip set 12 is electrically connected to the CPLD 11 through the PCH 13 is identical to the first preferred embodiment and thus is not repeated hereby.

Figure 4:
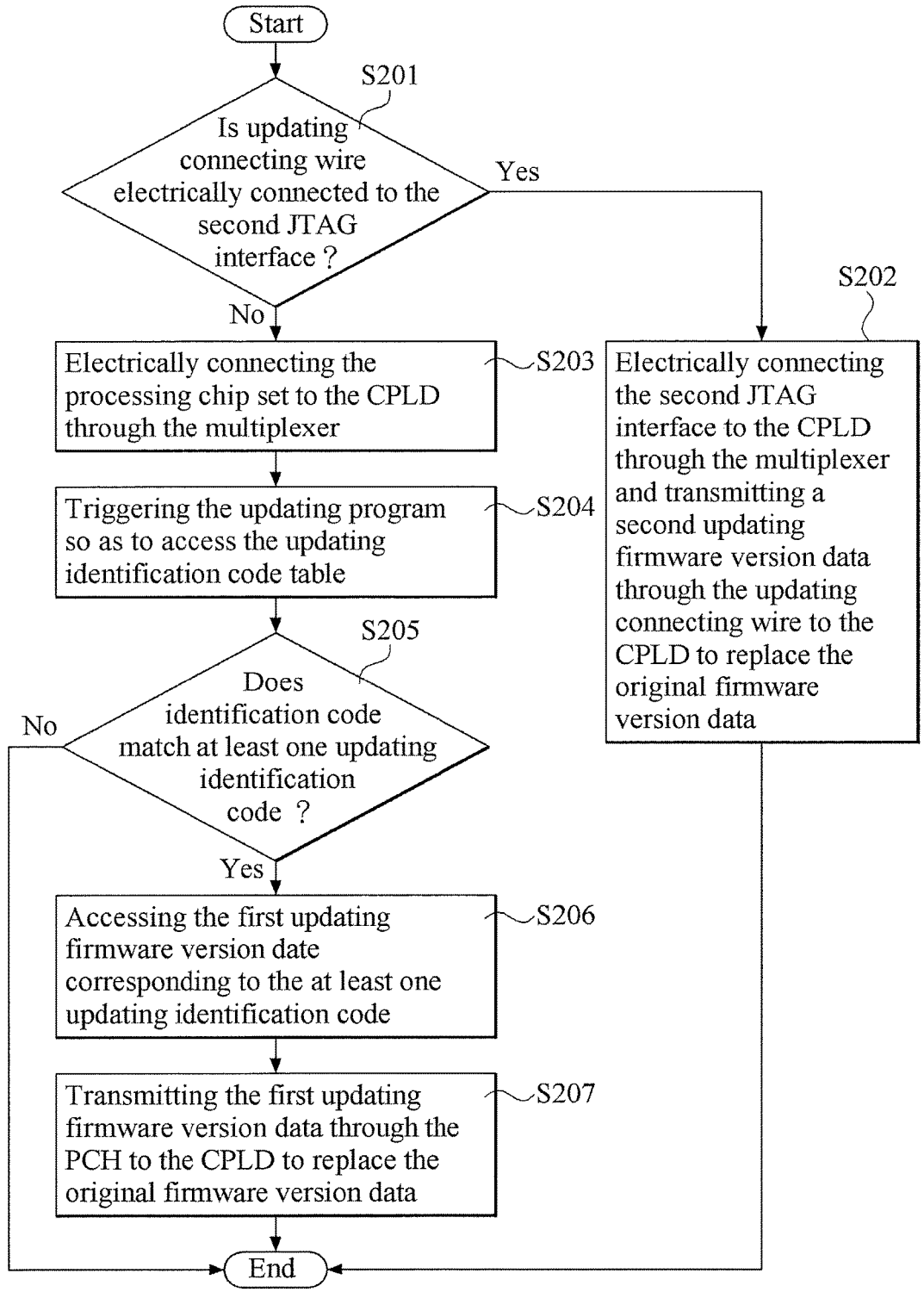
FIG. 4 is a flowing chart showing the updating system in accordance with second preferred embodiment of the present invention.

Please refer to both FIG. 3 and FIG. 4, wherein FIG. 4 is a flowing chart showing the updating system in accordance with second preferred embodiment of the present invention. As shown, the updating method of the present embodiment is applied to the updating system 1 of the firmware of the CPLD shown in FIG. 3, and is performed by using the updating system 1. The updating method comprises the steps of:

Step S201: determining whether the updating connecting wire 2 is electrically connected to the second JTAG interface 14.

Step S202: electrically connecting the second JTAG interface 14 to the CPLD 11 through the multiplexer 13 and transmitting a second updating firmware version data 31 through the updating connecting wire 2 to the CPLD 11 to replace the original firmware version data 111 so as to complete the updating procedure.

Step S203: electrically connecting the processing chip set 23 to the CPLD 11 through the multiplexer 13.

Step S204: triggering the updating program 1222 so as to access the updating identification code table 12111.

Step S205, determining whether the identification code 1211 matches one of the at least one updating identification code.

Step S206: accessing the first updating firmware version data 12112 corresponding to the at least one updating identification code.

Step S207: transmitting the first updating firmware version data 12112 through the PCH 121 to the CPLD 11 to replace the original firmware version data 111 so as to complete the updating process.

The above mentioned step S201 is performed by the detecting module 15. The above mentioned step S202 uses the detecting module 15 to transmit the first digital signal S1 to the multiplexer 13 to have the second JTAG interface 14 electrically connected to the CPLD 11 through the multiplexer 13, and uses the updating device 3 to transmit the second updating firmware version data 31 through the updating connecting wire 2 to the CPLD 11 to replace the original firmware version data 111 to complete the updating procedure. The step S203 is performed under the condition when the updating connecting wire 2 is not electrically connected to the second JTAG interface 14, and the detecting module 15 is used to transmit the second digital signal S2 to the multiplexer 13 to have the processing chip set 12 electrically connected to the CPLD 11 through the multiplexer 13. The steps S204 to S207 are identical to the steps S101 to S104 of the embodiment shown in FIG. 2 and thus are not repeated hereby.

In conclusion, by using the updating system of a firmware of the CPLD and the updating method thereof provided in accordance with the present invention, for the servers without BMC, the original firmware version data in the CPLD is still able to be updated through the PCH directly such that the operational convenience can be significantly enhanced.

The detail description of the aforementioned preferred embodiments is for clarifying the feature and the spirit of the present invention. The present invention should not be limited by any of the exemplary embodiments described herein, but should be defined only in accordance with the following claims and their equivalents. Specifically, those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. An updating system of a firmware of a complex programmable logic device (CPLD), comprising:
    a CPLD, having an original firmware version data; and
    a processing chipset, comprising:
        a platform controller hub (PCH), electrically connected to the CPLD, and including a storage unit, which stores an updating identification code table and at least one first updating firmware data, wherein the updating identification code table includes one-to-one correspondence between at least one updating identification code and the at least one first updating firmware data; and a processing unit, electrically connected to the PCH, and including an identification code and an updating program, wherein after the updating program is triggered, the processing unit accesses the updating identification code table from the storage unit, determines whether the identification code matches one of the at least one updating identification code, and when a match is found, captures the first updating firmware version data corresponding to the matched at least one updating identification code and transmits the first updating firmware version data through the PCH to the CPLD to replace the original firmware version data.

2. The updating system of claim 1, wherein the PCH is electrically connected to the CPLD through a first joint test action group (JTAG) interface.

3. The updating system of claim 1, wherein the processing unit is a central processing unit (CPU).

4. The updating system of claim 1, further comprising:
    a multiplexer, electrically connected between the CPLD and the processing chip set;
    a second JTAG interface, utilized for establishing an electric connection to a pluggable updating connecting wire; and
    a detecting module, electrically connected to the second JTAG interface and the multiplexer, for transmitting a first digital signal to the multiplexer when the updating connecting wire is plugged into and electrically connected to the second JTAG interface to have the second JTAG interface electrically connected to the CPLD through the multiplexer so as to transmit a second updating firmware version data through the updating connecting wire to the CPLD to replace the original firmware version data; and for transmitting a second digital signal to the multiplexer when the updating connecting wire is plugged out from the second JTAG interface to have the processing chip set electrically connected to the CPLD through the multiplexer so as to transmit the first updating firmware version data through the PCH to the CPLD to replace the original firmware version data when the updating program is triggered.

5. An updating method by using the updating system of a firmware of a complex programmable logic device (CPLD) of claim 1, comprising the steps of:
    (a) triggering the updating program to access the updating identification code table;
    (b) determining whether the identification code matches one of the at least one updating identification code;
    (c) if the determination of step (b) is yes, accessing the first updating firmware version data corresponding to the at least one updating identification code; and
    (d) transmitting the first updating firmware version data to the CPLD through the PCH to replace the original firmware version data.

6. The updating method of claim 5, wherein the PCH is electrically connected to the CPLD through a first joint test action group (JTAG) interface.

7. The updating method of claim 5, wherein the processing unit is a central processing unit (CPU).

8. The updating method of claim 5, wherein the updating system of the firmware of the CPLD comprises a multiplexer and a second JTAG interface, the multiplexer is electrically connected between the CPLD and the processing chip set, the second JTAG interface is utilized for establishing an electric connection to a pluggable updating connecting wire, and before the step (a) further comprising the steps of:
    (a0) determining whether the updating connecting wire is electrically connected to the second JTAG interface;
    (a1) if the determination of the step (a0) is yes, having the second JTAG interface electrically connected to the CPLD through the multiplexer and transmitting a second updating firmware version data through the updating connecting wire to the CPLD to replace the original firmware version data; and
    (a2) if the determination of the step (a0) is no, having the processing chip set electrically connected to the CPLD through the multiplexer and performing the step (a).

* * * * *